United States Patent [19]
Eldridge

[11] Patent Number: 5,960,548
[45] Date of Patent: Oct. 5, 1999

[54] PASTRY CUTTER FOR CUTTING TWO LAYERS OF DOUGH

[76] Inventor: Roger L. Eldridge, 10167 Sailwinds Blvd. N. No.205, Largo, Fla. 33773

[21] Appl. No.: 08/797,751

[22] Filed: Feb. 7, 1997

[51] Int. Cl.$^6$ ........................................................ B26B 3/04
[52] U.S. Cl. .................................. 30/299; 30/305; 30/315
[58] Field of Search ............................. 30/299, 301, 302, 30/303, 304, 305, 314, 315, 316, 280, 114, 115; D7/672, 675, 676

[56] References Cited

U.S. PATENT DOCUMENTS

| | | | |
|---|---|---|---|
| 164,667 | 6/1875 | Winslow | 30/301 X |
| 766,178 | 8/1904 | Gardner | 30/301 |
| 1,590,633 | 6/1926 | Lee | 30/301 |
| 4,836,396 | 6/1989 | Ancona et al. | 30/301 X |
| 5,403,335 | 4/1995 | Loomas et al. | 30/301 X |

FOREIGN PATENT DOCUMENTS

| | | | |
|---|---|---|---|
| 449311 | 6/1949 | Italy | 30/302 |

*Primary Examiner*—Clark F. Dexter
*Attorney, Agent, or Firm*—Ronald E. Smith

[57] ABSTRACT

A device for making food items from puff pastry includes an external, peripheral cutting blade having a structure like that of ordinary cookie cutters so that the shape of the external blade determines the shape of a section of dough that is separated from a larger section of dough in the well-known way. A pair of internal blades are spaced inwardly of the external blade, and are mounted to the external blade by a plurality of spacers. The internal blades are spaced from one another to define a pair of uncut gaps in the dough that is cut by them. In a second embodiment, a continuous internal blade is connected to the external blade by spacers, but is recessed with respect to the external blade so that it cuts through a top layer only of a puff pastry made from two layers of dough.

1 Claim, 3 Drawing Sheets

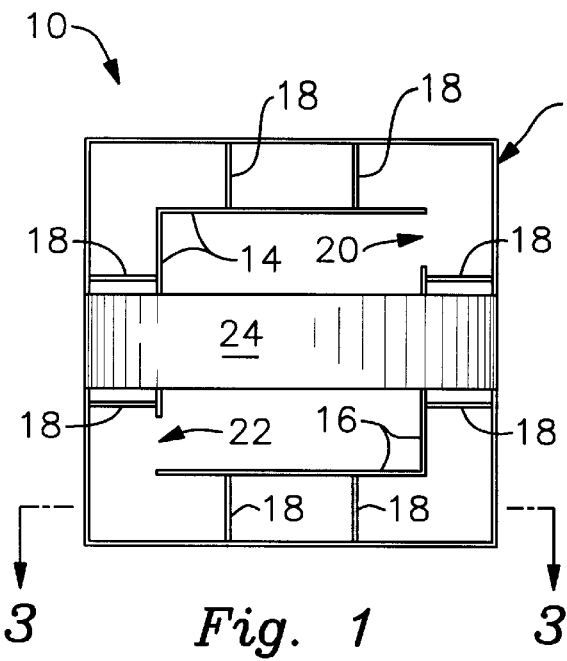
Fig. 1
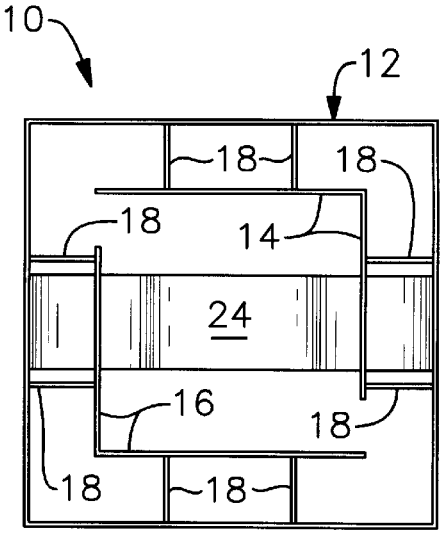
Fig. 2
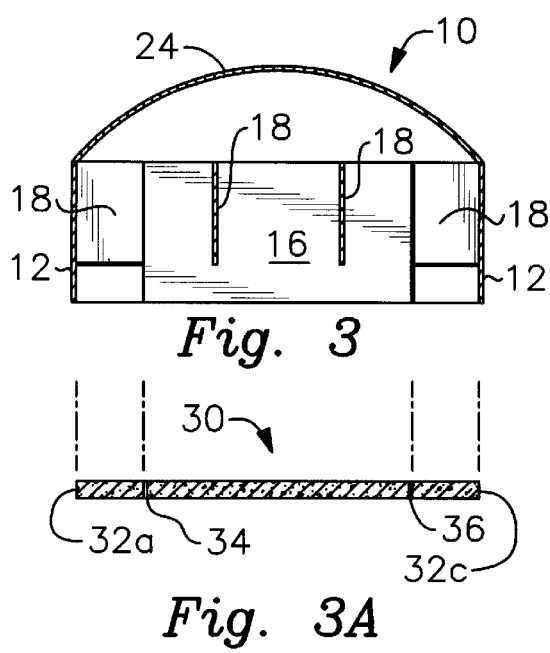
Fig. 3
Fig. 3A
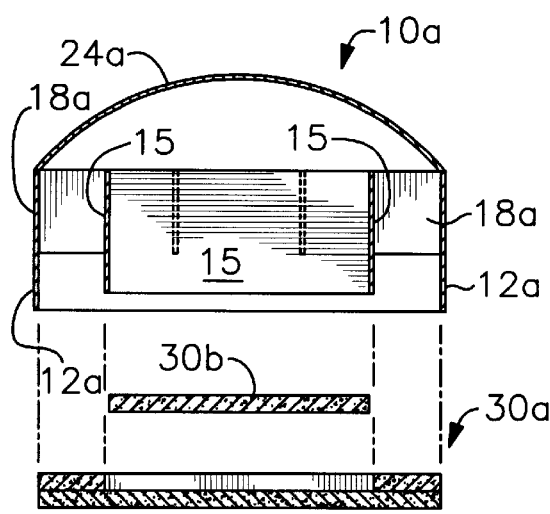
Fig. 4

PASTRY CUTTER FOR CUTTING TWO LAYERS OF DOUGH

BACKGROUND OF THE INVENTION

1. Field of the Invention

This invention relates, generally, to tools used in food preparation. More particularly, it relates to a pastry cutter that facilitates preparation of food items made from puff pastry.

2. Description of the Prior Art

Puff pastry is a butter and flour mixture commonly used in making various pastry dishes. It is difficult to work with, because it is brittle and easily breakable when cold and overly pliable and sticky at room temperature. In most cases, it is formed into a flat layer of dough about a quarter inch thick on a preparation table, and a common cutter, like a cookie cutter, is used to cut out individual sections for further manipulation by a chef or other food preparer. The initial cut, which segregates each piece of dough from all other pieces, is not particularly difficult to make because it is carried out before the dough reaches room temperature. However, it is time-consuming because it must be performed manually. The subsequent steps required to prepare the pastry for folding are more difficult due to the sticky nature of the butter/flour mixture at room temperature. The chef or other food preparer has to make several internal cuts in the dough, at certain locations mandated by the type of pastry to be made, and must then fold the dough by lifting an internal part thereof and repositioning it prior to insertion of the food item into an oven. If a large number of pastries are to be prepared, which is almost always the case in the context of a commercial food preparation operation, the dough becomes so warm and is so difficult to work with that many of the pastries have to be discarded because the preparation work becomes increasingly difficult and sloppier as the food preparers become tired.

None of the pastry or cookie cutters heretofore known are capable of assisting the food preparer in making the internal cuts. Those cutters having internal blades invariably make continuous cuts, thereby separating the dough into distinct pieces that are unconnected to one another. None of the known cutters make discontinuous internal cuts of the type needed when working with puff pastry.

What is needed, then, is a puff pastry cutter that makes the external cuts required to separate individual pieces of puff pastry from a larger piece, and that simultaneously makes discontinuous internal cuts to facilitate hand folding of the pastry prior to baking.

There is also a need for a puff pastry cutter for cutting out an opening having a preselected geometrical configuration in the upper layer of a pastry having two layers of dough where a top layer overlies a bottom layer.

However, in view of the art considered as a whole at the time the present invention was made, it was not obvious to those of ordinary skill in this art how the needed puff pastry cutters could be provided.

SUMMARY OF THE INVENTION

The longstanding but heretofore unfulfilled need for an apparatus that overcomes the limitations of the prior art is now met by a new, useful, and nonobvious invention.

The present invention is a device for cutting dough that includes an external, continuous cutting blade that defines a peripheral boundary of the device, where the peripheral boundary may be of any preselected geometrical configuration.

A pair of internal cutting blades of any preselected geometrical configuration are spaced inwardly of the external blade, are discontinuous with respect to one another, and are symmetrically opposed to one another.

Spacer means are provided for mounting the internal cutting blades to the external cutting blade; the external cutting blade, the internal cutting blades, and the spacers are disposed in an upright configuration which is vertical to a section of dough supported by a horizontal support surface when the device is in use. In a first embodiment, the external cutting blade and the internal cutting blades have a common height which is sufficient to cut completely through a section of dough of predetermined thickness.

The spacer means are disposed normal to the external cutting blade and the internal cutting and are spaced from one another along the respective extents of the external and internal blades. The spacer means have a height less than the height of the external and internal cutting blades so that the spacer means do not cut the dough, i.e., the lowermost edges of the respective spacer means are recessed with respect to the lowermost edges of the external and internal cutting blades.

In a second embodiment, a continuous internal cutting blade having a height less than that of the external cutting blade is provided, i.e., the cutting edge of the internal cutting blade is recessed with respect to the cutting edge of the external cutting blade. This embodiment has utility in cutting a design of preselected geometrical configuration from a top layer of dough in a pastry having a top and a bottom layer of dough. The external cutting blade cuts only the bottom layer of dough. The spacers have a height less than that of the internal cutting blade, i.e., they are recessed with respect to the cutting edge of the internal cutting blade and do not contact or cut the top or bottom layer of dough.

The novel method of this invention includes the steps of supporting a preselected portion of dough having a preselected thickness on a substantially horizontal support surface, employing an external cutting blade of continuous extent to separate a section of dough from the preselected portion, simultaneously employing a pair of internal cutting blades of discontinuous extent, relative to one another, to form a pair of internal cuts in the section of dough separated from said portion, said pair of cuts being spaced inwardly from said external cutting blade and said cuts being discontinuous with respect to one another. A first preselected peripheral edge of said dough is then lifted and folded into overlying relation to an internal cut of the pair of internal cuts that is opposed from said first peripheral edge. Next, a second preselected peripheral edge is lifted and folded into overlying relation to an internal cut that is opposed from said second peripheral edge. The food item is then ready for baking after the lifting and folding steps have been completed.

It is a primary object of this invention to provide a puff pastry cutter that facilitates the cutting of puff pastry in a way that enables such pastry to be worked with easily at room temperature.

Another object is to provide such a cutter that is economical to manufacture and which, therefore, is affordable to consumers.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a top plan view of a first illustrative embodiment of the novel cutter;

FIG. 2 is a bottom plan view thereof;

FIG. 3 is a sectional view taken along line 3—3 in FIG. 1;

FIG. 3A is a side elevational view of a section of puff pastry that has been cut by the cutter of FIGS. 1–3;

FIG. 4 is an exploded sectional view of a second embodiment of the novel cutter and a double layer of puff pastry;

DETAILED DESCRIPTION OF THE PREFERRED EMBODIMENT

Figure 5:
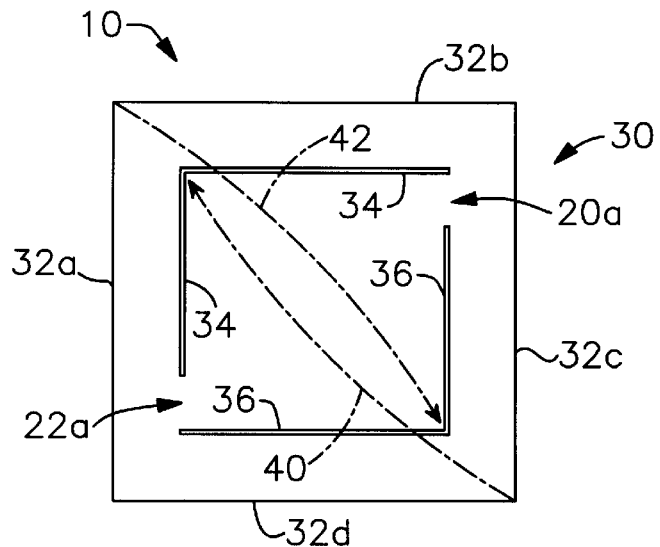
FIG. 5 is a top plan view of a section of puff pastry that has been cut with the cutter of FIGS. 1–3.

Referring now to FIGS. 1–3, it will there be seen that an exemplary embodiment of the invention is denoted as a whole by the reference numeral 10.

Pastry cutter 10 has an upstanding external peripheral blade 12 that, although depicted as being square in shape, may assume any predetermined geometrical configuration. For example, external blade 12 could be circular in configuration; a piece of puff pastry having a circular peripheral border would be produced thereby, such a piece being depicted in FIG. 8. Other external blade shapes would produce pastry pieces having peripheral borders such as those depicted in FIGS. 10, 12, and 13; there is no limit to the number of shapes the external blade could take.

External blade 12 performs the function of cutting a piece of puff pastry, one-quarter inch in thickness, from a larger piece of puff pastry of the same thickness. As such, blade 12 performs a function common to known pastry and cookie cutters, i.e., it spares the food preparer from the task of making the cuts required to separate the individual pastry pieces from the larger layer of dough.

In the embodiment of FIGS. 1–3, cutter 10 includes a pair of upstanding internal blades, denoted 14 and 16, that are attached to external blade 12 by a plurality of upstanding flat spacers, collectively denoted 18. Spacers 18, like external blade 12 and internal blades 14, 16, are oriented in a vertical plane when cutter 10 is in use on a horizontally disposed food preparation surface.

Significantly, internal blade 14 is discontinuous with respect to internal blade 16, thereby forming gaps 20, 22 therebetween. As best understood in connection with FIG. 5, the pastry is not cut in the part of the pastry that corresponds to such gaps; the uncut parts that correspond to the gaps are denoted 20a and 22a, respectively.

Handle 24 is a conventional cookie or pastry cutter handle.

FIG. 3A depicts in side elevation a piece of puff pastry 30 that has been cut with novel cutter 10. The square peripheral border 32 of said piece was formed by external blade 12 in the well-known way, and cuts 34, 36 were made by internal blades 14, 16, respectively.

FIG. 4 depicts a second embodiment 10a of the novel cutter; it is used when cutting a pastry formed from a double layer of pastry 30a. Its upstanding external blade 12a may have any predetermined geometrical configuration, just as external blade 12 of the first embodiment. Cutter 10a differs from cutter 10 primarily in that upstanding internal blade 15 is continuous and is recessed with respect to external blade 10a, i.e., said internal blade has a height less than that of the external blade. Thus, external blade 12a cuts but internal blade 15 does not cut the lower layer of the double layer of pastry 30a, and the part of the upper layer that is cut by the internal blade is completely cut from the balance of said upper layer so that a cut piece 30b may be removed; said cut piece 30b has a peripheral border that corresponds to the geometrical shape selected for internal blade 15. Upstanding spacers 18a have a common height less than that of internal blade 15, i.e., said spacers are recessed with respect to said internal blade 15 and do not contact or cut the dough.

Figure 6:
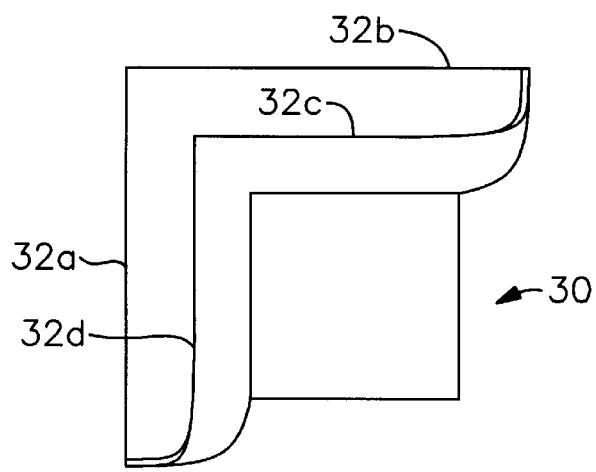
FIG. 6 is a perspective view depicting the FIG. 5 puff pastry after a first fold has been made therein.
Figure 7:
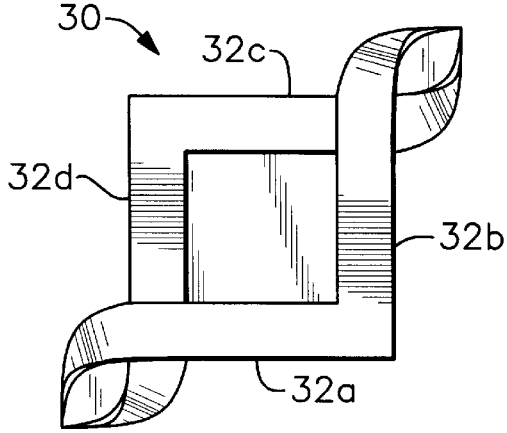
FIG. 7 is a perspective view depicting the FIG. 5 pastry after a second fold has been made therein.

Turning now to FIGS. 5–7 and returning to a description of single layer pastry cut by the cutter of FIGS. 1–3, it will there be seen that directional arrows 40, 42 indicate the first and second folds, respectively, made by the food preparer after use of novel cutter 10. The order of the folds is not critical.

FIG. 6 depicts the pastry after the fold indicated by arrow 40 has been made, and FIG. 7 depicts the pastry after the fold indicated by arrow 42 has been made. After both folds have been made, the pastry is ready for the oven. Peripheral border 32 is here denoted 32a–d so that the structures of FIGS. 6 and 7 are better understood. The folding steps form no part of the invention, per se, because they are the same as the folds made when the cuts are manually formed.

Figure 8:
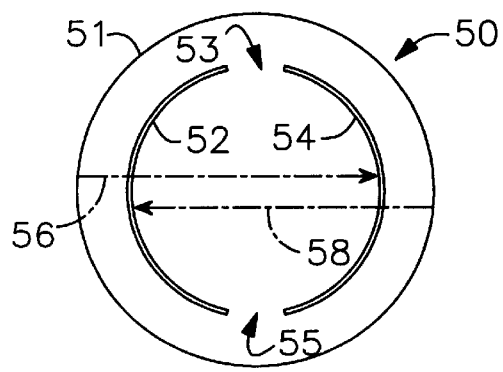
FIG. 8 is a top plan view of a piece of puff pastry made with a cutter having a circular external blade and semicircular internal blades.
Figure 9:
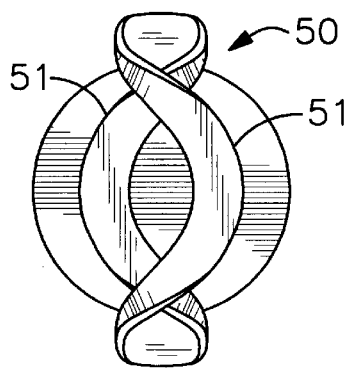
FIG. 9 depicts the FIG. 8 piece of pastry in plan view after both folds have been made therein.

The external and internal blades of the novel pastry cutter may take any shape, as mentioned earlier. For example, FIG. 8 depicts a pastry 50 made by a cutter having a circular external blade, that creates external periphery 51, and a pair of symmetrically opposed arcuate internal blades that form arcs 52, 54, respectively; note gaps 53, 55 where pastry 50 is uncut, said gaps corresponding to the area where the internal blades are discontinuous with respect to one another. The folds are denoted 56, 58; the appearance of the pastry after both folds have been made is provided in FIG. 9.

Figure 10:
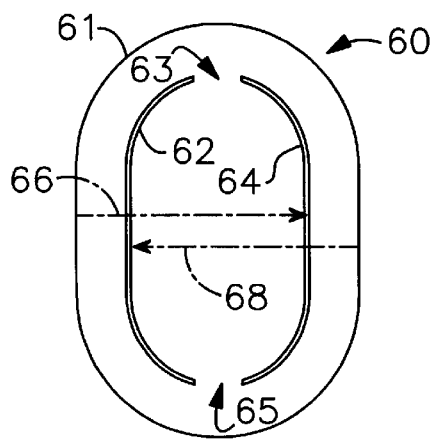
FIG. 10 is a top plan view of a piece of puff pastry made with a cutter having an external blade of oval configuration and internal blades the shape of which is apparent from the depicted cuts made thereby.
Figure 11:
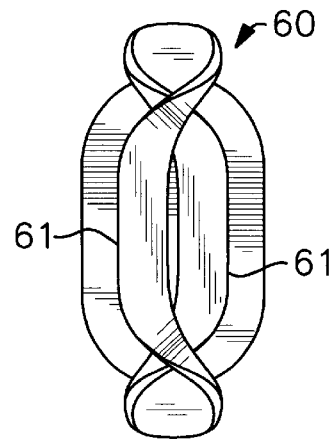
FIG. 11 depicts the FIG. 10 piece of pastry in plan view after both folds have been made therein.

Similarly, FIG. 10 depicts a pastry 60 made by a generally oval external blade, that produces oval external periphery 61, and a symmetrically opposed pair of arcuate internal blades having the same contour as cuts 62, 64. Note that said internal blades leave a gap between them; in this sense the blades are discontinuous. Note further the uncut areas 63, 65 that correspond to the gaps defined by the blades. Directional arrows 66, 68 in FIG. 10 indicate the folds that are made prior to heating the pastry in an oven, and the folded pastry is depicted in FIG. 11.

Figure 12:
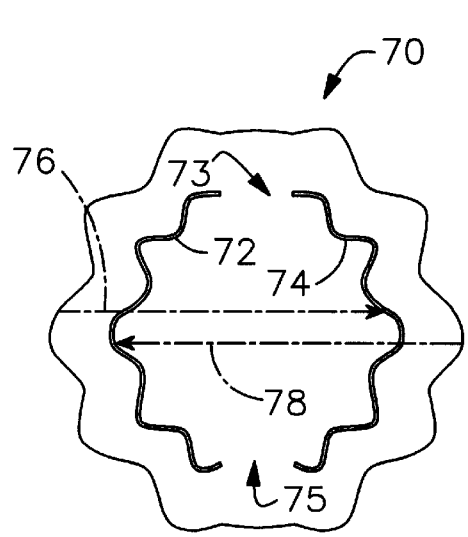
FIG. 12 is a top plan view of a piece of puff pastry made with a cutter having an external blade of fluted configuration and matching internal blades.

FIG. 12 depicts a pastry 70 made by a generally round, fluted external blade and a pair of arcuate internal blades having the same contour as cuts 72, 74. The gap between the internal blades corresponds to uncut parts 73 and 75. Directional arrows 76, 78 in FIG. 12 indicate the folds that are made prior to heating the pastry in an oven.

Figures 13, 14:
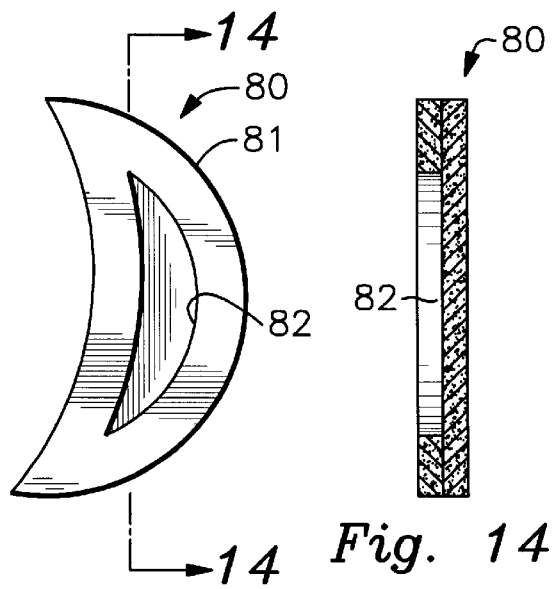
FIG. 13 is a top plan view of a double layer of puff pastry that has been formed by a cutter of the type depicted in FIG. 4.
FIG. 14 is a sectional view taken along line 14—14 in FIG. 13.

A double-layered pastry 80 having a crescent-shaped external peripheral border 81 is depicted in FIG. 13; it is made with a cutter having the structure of the cutter depicted in FIG. 4, i.e., it includes a crescent-shaped internal blade that is recessed with respect to a crescent-shaped external blade. Thus, a crescent-shaped internal cut 82 is made through the top layer only, as perhaps best understood in connection with FIG. 14, by said internal blade; the internal blade is attached to the external blade by spacers 18 as in all other embodiments. This enables a crescent-shaped inner part of the upper layer of puff pastry to be removed.

Note that spacers 18 of the first embodiment and spacers 18*a* of the second embodiment have a height less than the height of the external and internal blades; thus, said spacers do not cut the pastry.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A device for cutting two layers of dough where a first layer overlies a second layer, comprising:

an external, continuous cutting blade that defines a peripheral boundary of the device, said peripheral boundary having a preselected geometrical configuration;

said external, continuous cutting blade being disposed in a generally vertical configuration;

said external, continuous cutting blade having a first predetermined height;

an internal, continuous cutting blade having a preselected geometrical configuration, said internal, continuous cutting blade being spaced inwardly relative to said external, continuous cutting blade and defining a closed area;

said internal, continuous cutting blade being disposed in a generally vertical configuration;

spacer means for mounting said internal, continuous cutting blade to said external, continuous cutting blade;

said spacer means including a plurality of flat, upstanding spacer members that are spaced apart from one another;

each of said flat spacer members being disposed in interconnecting relation between said external, continuous cutting blade and said internal, continuous cutting blade;

each of said flat spacer members being disposed in normal relation to said external, continuous cutting blade and said internal, continuous cutting blade;

said internal, continuous cutting blade being vertically recessed with respect to said external, continuous cutting blade;

said internal, continuous cutting blade having a preselected height less than the preselected height of said external, continuous cutting blade; and said spacer members being vertically recessed with respect to said internal, continuous cutting blade and having a common preselected height less than the preselected height of said internal, continuous cutting blade;

whereby said external, continuous cutting blade is adapted to cut through said first and second layers of dough; and whereby said internal, continuous cutting blade is adapted to cut through said first layer of dough but not said second layer.

* * * * *